United States Patent
Zhang et al.

(10) Patent No.: US 12,260,763 B2
(45) Date of Patent: Mar. 25, 2025

(54) DYNAMIC REGULATION METHODS FOR LANE CHANGING DECISION POINT OF CAV DEDICATED LANE IN DIVERGING AREA OF EXPRESSWAY

(71) Applicants: HEFEI UNIVERSITY OF TECHNOLOGY, Anhui (CN); HEFEI UNIVERSITY OF TECHNOLOGY DESIGN INSTUTUTE (GROUP) CO., LTD., Anhui (CN); ANHUI BAICHENG HUITONG TECHNOLOGY CO., LTD., Anhui (CN)

(72) Inventors: Weihua Zhang, Hefei (CN); Taifeng Ni, Hefei (CN); Heng Ding, Hefei (CN); Haijian Bai, Hefei (CN); Wenjia Zhu, Hefei (CN); Chun Wang, Hefei (CN); Ye Yu, Hefei (CN); Zeyang Cheng, Hefei (CN); Wanli Dong, Hefei (CN)

(73) Assignees: HEFEI UNIVERSITY OF TECHNOLOGY, Hefei (CN); HEFEI UNIVERSITY OF TECHNOLOGY DESIGN INSTUTUTE (GROUP) CO., LTD., Hefei (CN); ANHUI BAICHENG HUITONG TECHNOLOGY CO., LTD., Hefei (CN)

( * ) Notice: Subject to any disclaimer, the term of this patent is extended or adjusted under 35 U.S.C. 154(b) by 0 days.

(21) Appl. No.: 18/674,028

(22) Filed: May 24, 2024

(65) Prior Publication Data
US 2024/0395148 A1 Nov. 28, 2024

(30) Foreign Application Priority Data
May 24, 2023 (CN) .......................... 202310592688.6

(51) Int. Cl.
G08G 1/16 (2006.01)

(52) U.S. Cl.
CPC .................................. G08G 1/167 (2013.01)

(58) Field of Classification Search
CPC .......... B60W 30/18163; B60W 30/16; B60W 40/04; B60W 2554/4023; B60W 2554/80;
(Continued)

(56) References Cited

U.S. PATENT DOCUMENTS

2019/0061780 A1* 2/2019 Han ...................... G05D 1/0061
2019/0381997 A1* 12/2019 Skokan ................ B60W 50/08
(Continued)

FOREIGN PATENT DOCUMENTS

CN 113246985 A 8/2021
CN 113345268 A 9/2021
(Continued)

OTHER PUBLICATIONS

Ding, Jianxun et al., Car-following and Lane-changing Behaviors Near an Intersection, Journal of Transporation Systems Engineering and Information Technology, 17(3): 60-66, 2017.
(Continued)

Primary Examiner — Rachid Bendidi
Assistant Examiner — Hossam M El Abd Latif
(74) Attorney, Agent, or Firm — Porus IP LLC

(57) ABSTRACT

Disclosed is a dynamic regulation method for a lane changing decision point of a CAV dedicated lane in a diverging area of an expressway, applied to the diverging area of the expressway in which the CAV dedicated lane is provided at an inner side of a road. Vehicles traveling in the CAV dedicated lane are all CAVs. Both the CAVs and human-driven vehicles can travel in ordinary lanes. The method calculates the lane changing decision points of diversion vehicles in the CAV dedicated lane at current time using
(Continued)

corresponding algorithms based on a relationship between the lane changing decision points of the CAV dedicated lane and traffic efficiency and a traffic safety. The dynamic regulation method of the present disclosure improves the traffic operation condition of the diversion region, improves traffic efficiency and traffic safety of the diversion region, and reduces fuel emissions, thereby providing a method support for the traffic flow control in the diverging area of the expressway under the setting condition of the CAV dedicated lane.

3 Claims, 3 Drawing Sheets

(58) Field of Classification Search
CPC .. B60W 2552/53; G08G 1/167; G06V 20/588
USPC .............................................. 701/1
See application file for complete search history.

(56) References Cited

U.S. PATENT DOCUMENTS

| 2023/0124490 | A1* | 4/2023 | Konishi | B60W 30/16 |
| | | | | 701/301 |
| 2024/0262381 | A1* | 8/2024 | Wang | B60W 60/001 |
| 2024/0286650 | A1* | 8/2024 | Bowman | G06F 30/20 |
| 2024/0326793 | A1* | 10/2024 | Puphal | B60W 60/0027 |
| 2024/0355202 | A1* | 10/2024 | Oyama | G08G 1/0145 |

FOREIGN PATENT DOCUMENTS

| CN | 114771522 A | 7/2022 |
| CN | 115662131 A | 1/2023 |
| CN | 116153137 A | 5/2023 |

OTHER PUBLICATIONS

Yang, Xiaofang et al., Decision Strategy Models of Merge Influence Area for Outside Vehicles Based on Vehicle-vehicle Communication, Journal of Systems Simulation, 27(5): 1112-1119, 1126, 2015.

Shunsuke Aoki et al., MultiCruise: Eco-Lane Selection Strategy with Eco-Cruise Control for Connected and Automated Vehicles, 2021 IEEE Intelligent Vehicles Symposium (IV), 2021, 7 pages.

Decision to Grant a Patent in Chinese Application No. 202310592688.6 mailed on May 24, 2023, 5 pages.

* cited by examiner

DYNAMIC REGULATION METHODS FOR LANE CHANGING DECISION POINT OF CAV DEDICATED LANE IN DIVERGING AREA OF EXPRESSWAY

CROSS-REFERENCE TO RELATED APPLICATIONS

The present disclosure claims priority to Chinese Application No. 202310592688.6, filed on May 24, 2023, the entire contents of which are incorporated herein by reference.

TECHNICAL FIELD

The present disclosure relates to the field of traffic control of networked vehicles, in particular to the field of lane changing control of connected automated vehicles (CAVs) in dedicated lanes of expressways, and specifically to a dynamic regulation method for a lane changing decision point of a CAV dedicated lane in a diverging area of an expressway.

BACKGROUND

Expressway is the skeleton of the urban transportation network, carrying most of the traffic, and its traffic efficiency directly determines the performance of the urban transportation network. There are a large number of speed changing, direction changing, and lane changing traffic flows in the diverging area of the expressway, and the resulting large number of diverging and merging conflicts, intersection conflicts, and traveling disorder may greatly reduce the traffic operation efficiency of the expressway.

With the development of the connected and automated driving technique and the vehicle infrastructure cooperated driving technique, the proportion of CAVs will become higher and higher, and transportation will be in the stage of hybrid connected driving environment for a long time. Because CAVs can perform information interaction to obtain surrounding traffic information, and complete control by means of artificial intelligence (AI), visual computing, and positioning systems without the need for human driving, CAVs can travel in shorter headway, shorter reaction time, and more stable speed. When the proportion of CAVs is high in a hybrid networking environment, setting CAV dedicated lanes on the expressway can greatly improve the operation efficiency of the traffic flow. However, the lane changing conflicts of a large number of CAVs in the diverging area of the expressway and the diverging and merging conflicts with the normal traveling of human-driven vehicles will affect the stable operation of the traffic flow and reduce the interval speed of the traffic flow.

SUMMARY

One of the embodiments of the present disclosure provides a dynamic regulation method for a lane changing decision point of a CAV dedicated lane in a diverging area of an expressway, applied to a one-way three-lane road. Three lanes may be denoted as a first lane, a second lane, and a third lane, respectively, from the inside to the outside. The first lane may be a CAV dedicated lane, and the second and third lanes may be ordinary lanes. CAV denotes a connected automated vehicle. Only the CAVs are allowed to travel on the CAV dedicated lane. Vehicle types on the ordinary lanes are not restricted. A deceleration lane may be provided at an outer side of the third lane. An exit ramp may be provided in front of the deceleration lane. The dynamic regulation method may comprise the following operations.

Operation 1, a plane coordinate system may be established with an intersection point of a road centerline of the exit ramp and a road centerline of the deceleration lane as an origin, a traveling direction of vehicles as a positive direction of an x-axis, and a direction perpendicular to the x-axis as a y-axis.

A road with an upstream length s of the exit ramp may be used as the diverging area of the expressway.

A CAV dedicated lane dynamic regulation region may be provided on the CAV dedicated lane at an innermost side of an upstream road of the exit ramp. The CAV dedicated lane dynamic regulation region refers to a rectangular region with the origin as a starting point, a horizontal coordinate $x_L$ on the x-axis as an end point, and a length of L.

The CAV dedicated lane dynamic regulation region may include a forced lane changing region and a free lane changing region.

The forced lane changing region refers to a rectangular region with the origin as a starting point, a horizontal coordinate $x_f$ on the x-axis as an end point, and a length of $L_c$.

The free lane changing region refers to a rectangular region with the horizontal coordinate $x_f$ on the x-axis as a starting point, a horizontal coordinate $x_L$ on the x-axis as an end point, and a length of $L_f$.

A diversion ratio detection region of a length $L_b$ may be provided on the one-way three-lane road of the upstream road of the CAV dedicated lane dynamic regulation region. The diversion ratio detection region refers to a rectangular region with the horizontal coordinate $x_L$ on the x-axis as a starting point, a horizontal coordinate $x_b$ on the x-axis as an end point, wherein $s > L + L_b$.

Operation 2, vehicle information of the one-way three-lane road at time t may be collected, including a count of vehicles, and positions, speeds, and accelerations of the vehicles.

Operation 3, whether total traffic flow $Q(t) \geq Q_h$ on the one-way three-lane road at the time t is valid may be determined. In response to determining that the total traffic flow $Q(t) \geq Q_h$ on the one-way three-lane road at the time t is valid, operation 4 may be performed; and in response to determining that the total traffic flow $Q(t) \geq Q_h$ on the one-way three-lane road at the time t is not valid, operation 10 may be performed; wherein $Q_h$ denotes a road traffic flow threshold for dynamic regulation.

Operation 4, a count of CAVs $m_{total}(t)$ in the diversion ratio detection region at the time t may be collected, and a count of CAVs $m_{sr}(t)$ in the diversion ratio detection region about to leave their own lanes and enter the exit ramp at the time t may be counted.

Operation 5, a vehicle diversion ratio $\lambda_{sr}(t)$ at the time t may be calculated using formula (1):

$$\lambda_{sr}(t) = \frac{m_{sr}(t)}{m_{total}(t)}. \qquad (1)$$

Operation 6, an ith CAV in the first lane at the time t is denoted as an ith vehicle $q_i^1(t)$ in the first lane, and an optimal lane changing decision point position $l_{i,opt}(t)$ of the ith vehicle $q_i^1(t)$ in the first lane within the CAV dedicated lane dynamic regulation region at the time t may be determined.

Operation 6.1, an optimal lane changing decision point position $l_{i,sms}(t)$ of the ith vehicle $q_i^1(t)$ in the first lane based on traffic efficiency within the CAV dedicated lane dynamic regulation region at the time t may be calculated using formula (2):

$$\begin{cases} S_{\lambda_{sr}}[l_i(t)] = \alpha_1 l_i^3(t) + \alpha_2 l_i^2(t) + \alpha_3 l_i(t) + b \\ s_{\lambda_{sr}}[l_{i,sms}(t)] = \max_{l_i(t)} S_{\lambda_{sr}}[l_i(t)] \end{cases} \quad (2)$$

wherein $l_i(t)$ denotes a lane changing decision point position of the ith vehicle $q_i^1(t)$ in the first lane at the time t; $\alpha_1$, $\alpha_2$, $\alpha_3$ and b denote four parameters of the cubic polynomial, and $S_{\lambda_{sr}}[\cdot]$ denotes a correspondence relationship between the lane changing decision point and the traffic efficiency.

Operation 6.2, an optimal lane changing decision point position $l_{i,tit}(t)$ of the ith vehicle $q_i^1(t)$ in the first lane based on a safety risk within the CAV dedicated lane dynamic regulation region at the time t may be calculated using formula (3):

$$\begin{cases} T_{\lambda_{sr}}[l_i(t)] = \beta_1 l_i^3(t) + \beta_2 l_i^2(t) + \beta_3 l_i(t) + d \\ T_{\lambda_{sr}}[l_{i,tit}(t)] = \min_{l_i(t)} T_{\lambda_{sr}}[l_i(t)] \end{cases} \quad (3)$$

wherein $\beta_1$, $\beta_2$, $\beta_3$ and d denote four parameters of the cubic polynomial, and $T_{\lambda_{sr}}[\cdot]$ denotes a correspondence relationship between the lane changing decision point and the safety risk.

Operation 6.3, an optimal lane changing decision point position $l_{i,opt}(t)$ of the ith vehicle $q_i^1(t)$ in the first lane within the CAV dedicated lane dynamic regulation region at the time t may be calculated using formula (4):

$$l_{i,opt}(t) = k_1 l_{i,sms}(t) + k_2 l_{i,tit}(t) \quad (4)$$

wherein $k_1$ and $k_2$ denote two correction factors, and $k_1 + k_2 = 1$.

Operation 7, whether the ith vehicle $q_i^1(t)$ in the first lane has a requirement for lane changing may be determined, in response to determining that the ith vehicle $q_i^1(t)$ in the first lane has the requirement for lane changing, operation 7.1 may be performed; and in response to determining that the ith vehicle $q_i^1(t)$ in the first lane does not have the requirement for lane changing, operation 10 may be performed.

Operation 7.1, whether a horizontal coordinate $x_i(t) \geq l_{i,opt}(t)$ of the ith vehicle $q_i^1(t)$ in the first lane at the time t is valid may be determined, in response to determining that the horizontal coordinate $x_i(t) \geq l_{i,opt}(t)$ of the ith vehicle $q_i^1(t)$ in the first lane at the time t is valid, operation 7.2 may be performed; and in response to determining that the horizontal coordinate $x_i(t) \geq l_{i,opt}(t)$ of the ith vehicle $q_i^1(t)$ in the first lane at the time t is not valid, operation 10 may be performed.

Operation 7.2, whether $x_i(t) < x_f$ is valid may be determined, in response to determining that $x_i(t) < x_f$ is valid, operation 8 may be performed; and in response to determining that $x_i(t) < x_f$ is not valid, operation 9 may be performed.

Operation 8, a rear vehicle in the second lane relative to the ith vehicle $q_i^1(t)$ in the first lane is denoted as a rear vehicle $q_{j+1}^2(t)$ in the second lane, and a previous vehicle in the second lane relative to the ith vehicle $q_i^1(t)$ in the first lane is denoted as a previous vehicle $q_j^2(t)$ in the second lane;

in response to determining that the ith vehicle $q_i^1(t)$ in the first lane satisfies formula (5), the ith vehicle $q_i^1(t)$ in the first lane may change from the first lane to the second lane, and the operation 10 may be performed; and in response to determining that the ith vehicle $q_i^1(t)$ in the first lane does not satisfy the formula (5), the ith vehicle $q_i^1(t)$ in the first lane may continue to travel in the first lane, and the operation 10 may be performed;

$$\begin{cases} x_j(t) - x_i(t) > d_{safe} \\ x_i(t) - x_{j+1}(t) > d_{safe} \end{cases} \quad (5)$$

wherein $x_j(t)$ denotes a horizontal coordinate of the previous vehicle $q_j^2(t)$ in the second lane at the time t; $x_{j+1}^2(t)$ denotes a horizontal coordinate of the rear vehicle $q_{j+1}^2(t)$ in the second lane at the time t; and $d_{safe}$ denotes a safety distance maintained by the ith vehicle $q_i^1(t)$ in the first lane from the previous vehicle $q_j^2(t)$ in the second lane and the rear vehicle $q_{j+1}^2(t)$ in the second lane when the ith vehicle $q_i^1(t)$ in the first lane enters the second lane.

Operation 9, a last lane changing point position $x_{last}$ of the ith vehicle $q_i^1(t)$ in the first lane may be determined using formula (6); and whether $x_i(t) < x_{last}$ is valid may be determined, in response to determining that $x_i(t) < x_{last}$ is valid, operation 9.1 may be performed; and in response to determining that $x_i(t) < x_{last}$ is not valid, the ith vehicle $q_i^1(t)$ in the first lane may complete lane changing by a manner of stopping and waiting, and the operation 10 may be performed;

$$x_{last} = L - \frac{v_i^2(f)}{2a_{max}} + x_L \quad (6)$$

wherein $a_{max}$ denotes a maximum emergency braking acceleration of the CAV; and $v_i(t)$ denotes a speed of the ith vehicle $q_i^1(t)$ in the first lane at the time t.

Operation 9.1, a safety distance $d_{behind}(t)$ maintained by the ith vehicle $q_i^1(t)$ in the first lane within the forced lane changing region at the time t from the rear vehicle $q_{j+1}^2(t)$ in the second lane when the ith vehicle $q_i^1(t)$ in the first lane changes to the second lane and a safety distance $d_{front}(t)$ maintained by the ith vehicle $q_i^1(t)$ in the first lane within the forced lane changing region at the time t from the previous vehicle $q_j^2(t)$ in the second lane when the ith vehicle $q_i^1(t)$ in the first lane changes to the second lane may be obtained using formula (7):

$$\begin{cases} x_i(t) - x_{j+1}(t) = L_{behind}(t) \\ x_j(t) - x_i(t) = L_{front}(t) \\ d_{behind}(t) = \frac{v_{j+1}(t) \cdot \Delta t}{\eta_1} + \eta_2 - l_{veh} \\ d_{front}(t) = \frac{v_i(t) \cdot \Delta t}{\eta_1} + \eta_2 - l_{veh} \end{cases} \quad (7)$$

wherein $L_{behind}(t)$ denotes a longitudinal distance between the ith vehicle $q_i^1(t)$ in the first lane and the rear vehicle $q_{j+1}^2(t)$ in the second lane at the time t; $L_{front}(t)$ denotes a longitudinal distance between the ith vehicle $q_i^1(t)$ in the first lane and the previous vehicle $q_{j+1}^2(t)$ in the second lane at the time t; $v_{j+1}(t)$ denotes a speed of the rear vehicle $q_{j+1}^2(t)$ in the second lane at the time t; $\Delta t$ denotes a time interval; $\eta_1$ and $\eta_2$ denote two parameters; and $L_{veh}$ denotes a vehicle length.

Operation 9.2, whether $L_{behind}(t) \geq d_{behind}(t)$ and $L_{front}(t) \geq d_{front}(t)$ are valid may be determined, in response to determining that $L_{behind}(t) \propto d_{behind}(t)$ and $L_{front}(t) \geq d_{front}(t)$ are valid, the ith vehicle $q_i^1(t)$ in the first lane may change to the second lane, and the operation 10 may be performed; and in response to determining that $L_{behind}(t) \geq d_{behind}(t)$ and $L_{front}(t) \geq d_{front}(t)$ are not valid, operation 9.3 may be performed.

Operation 9.3, whether $L_{behind}(t) + L_{front}(t) \geq d_{behind}(t) + d_{front}(t)$ is valid may be determined, in response to determining that $L_{behind}(t) + L_{front}(t) \geq d_{behind}(t) + d_{front}(t)$ is valid, operation 9.4 may be performed; and in response to determining that $L_{behind}(t) + L_{front}(t) \geq d_{behind}(t) + d_{front}(t)$ is not valid, the ith vehicle $q_i^1(t)$ in the first lane may decelerate and keep traveling in the original lane, and the operation 10 may be performed.

Operation 9.4, whether $L_{behind}(t) \geq d_{behind}(t)$ and $L_{front}(t) < d_{front}(t)$ are valid may be determined, in response to determining that $L_{behind}(t) \geq d_{behind}(t)$ and $L_{front}(t) < d_{front}(t)$ are valid, the ith vehicle $q_i^1(t)$ in the first lane may decelerate until the safety distance of the ith vehicle $q_i^1(t)$ in the first lane from the previous vehicle $q_j^2(t)$ in the second lane is greater than $d_{front}(t)$ and change to the second lane, and the operation 10 may be performed;

whether $L_{behind}(t) < d_{behind}(t)$ and $L_{front}(t) \geq d_{front}(t)$ are valid may be determined, in response to determining that $L_{behind}(t) < d_{behind}(t)$ and $L_{front}(t) \geq d_{front}(t)$ are valid, the ith vehicle $q_i^1(t)$ in the first lane may accelerate until the safety distance of the ith vehicle $q_i^1(t)$ in the first lane from the rear vehicle $q_{j+1}^2(t)$ in the second lane is greater than $d_{behind}(t)$ and change to the second lane, and the operation 10 may be performed; and whether $L_{behind}(t) < d_{behind}(t)$ and $L_{front}(t) < d_{front}(t)$ are valid may be determined, in response to determining that $L_{behind}(t) < d_{behind}(t)$ and $L_{front}(t) < d_{front}(t)$ are valid, the ith vehicle $q_i^1(t)$ in the first lane may decelerate and keep traveling in the original lane, and the operation 10 may be performed.

Operation 10, $t+\Delta t$ may be assigned to t, whether $t \geq t_e$ is valid may be determined, in response to determining that $t \geq t_e$ is valid, regulation may be completed; and in response to determining that $t \geq t_e$ is not valid, the process may return to the operation 2 for sequential operation; wherein $t_e$ denotes a total regulation duration.

One of the embodiments of the present disclosure provides an electronic device, comprising a storage device and a processor. The storage device may be configured to store programs for supporting the processor in performing the dynamic regulation method. The processor may be configured to execute the programs stored in the storage device.

One of the embodiments of the present disclosure provides a non-transitory computer-readable storage medium comprising computer programs that, when executed by a processor, may direct the processor to perform the operations of the dynamic regulation method.

BRIEF DESCRIPTION OF THE DRAWINGS

The present disclosure will be further illustrated by way of exemplary embodiments, which will be described in detail by means of the accompanying drawings. These embodiments are not limiting, and in these embodiments, the same numbering indicates the same structure, wherein.

DETAILED DESCRIPTION

Figure 1:
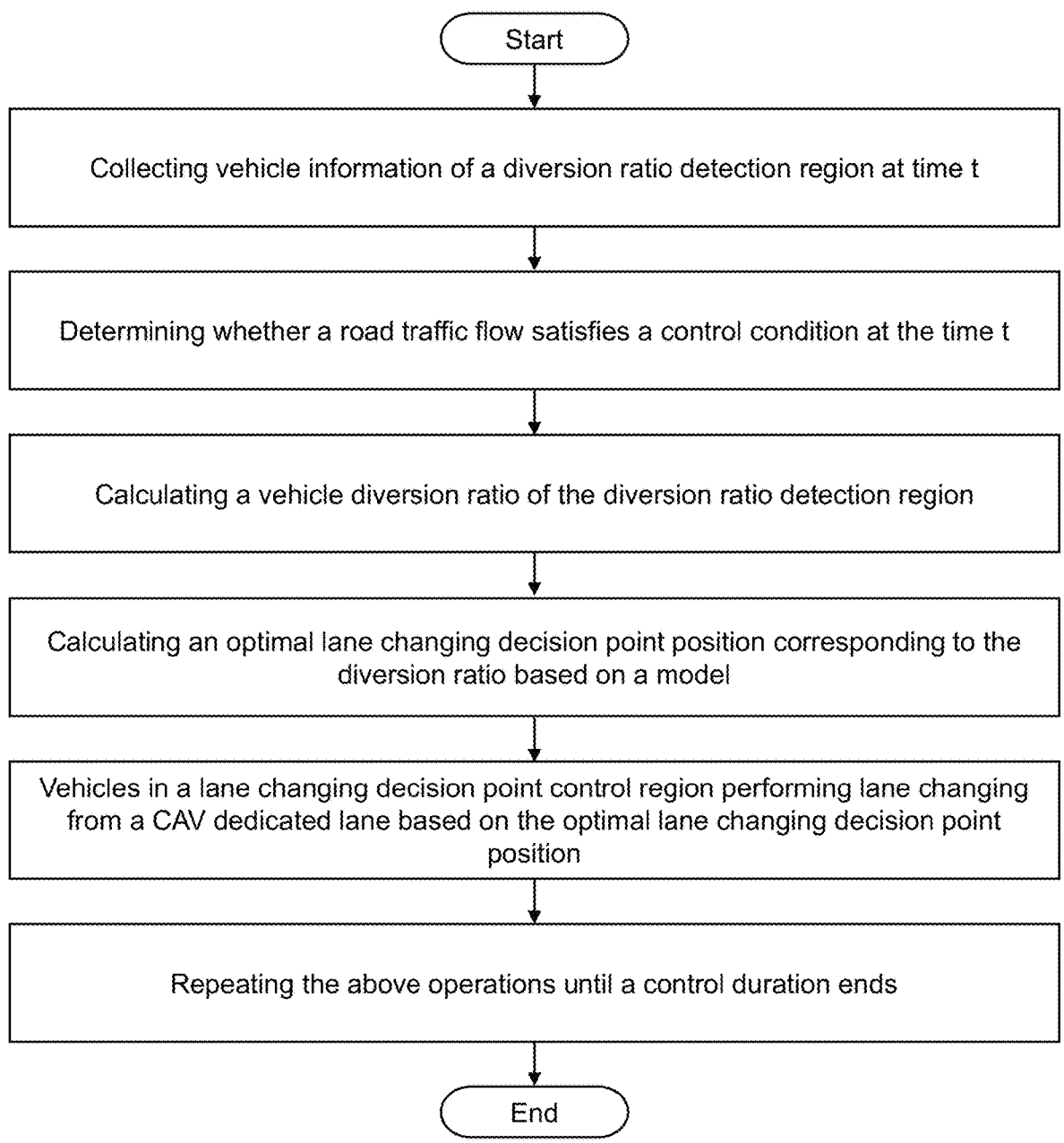
FIG. 1 is a flowchart illustrating an exemplary dynamic regulation method according to some embodiments of the present disclosure.

In order to more clearly illustrate the technical solutions of the embodiments of the present disclosure, the accompanying drawings required to be used in the description of the embodiments are briefly described below. Obviously, the accompanying drawings in the following description are only some examples or embodiments of the present disclosure, and it is possible for a person having ordinary skills in the art to apply the present disclosure to other similar scenarios in accordance with these drawings without creative labor. Unless obviously obtained from the context or the context illustrates otherwise, the same numeral in the drawings refers to the same structure or operation.

As indicated in the disclosure and claims, the terms "a", "an", and/or "the" are not specific to the singular form and may include the plural form unless the context clearly indicates an exception. Generally speaking, the terms "comprising" and "including" only suggest the inclusion of clearly identified steps and elements, and these steps and elements do not constitute an exclusive list, and the method or device may also contain other steps or elements.

The flowchart is used in the present disclosure to illustrate the operations performed by the system according to the embodiments of the present disclosure. It should be understood that the preceding or following operations are not necessarily performed in the exact order. Instead, various steps may be processed in reverse order or simultaneously. Meanwhile, other operations may be added to these procedures, or a certain step or steps may be removed from these procedures.

Some embodiments of the present disclosure provide a dynamic regulation method for a lane changing decision point of a CAV dedicated lane in a diverging area of an expressway. The vehicle lane changing decision point on the CAV dedicated lane can be dynamically regulated in consideration of the influence factor of the diversion ratio of the diversion region when the traffic flow of the expressway is relatively high, so that the situation that the lane changing positions of CAVs are too centralized, which disrupts the normal traffic order of the traffic flow can be avoided, thereby improving the safety and efficiency of the operation of the traffic flow in the diverging area of the expressway.

In some embodiments, a CAV control platform may perform one or more operations of the dynamic regulation method. All the CAVs may be registered in the CAV control platform prior to traveling, allowing the CAV control platform to perform control.

The CAV control platform may include a processor. The processor may process data and/or information obtained from other devices of the CAV control platform or the CAVs. In some embodiments, the processor may include one or more sub-processing devices (e.g., a single-core processing device or a multi-core processing device). Merely by way of example, the processor may include a central processing unit (CPU), an application-specific integrated circuit (ASIC), or the like, or any combination thereof. In some embodiments, the processor may be configured to issue control instructions to control behaviors (e.g., lane changing, braking, etc.) of the CAVs.

Figure 2:
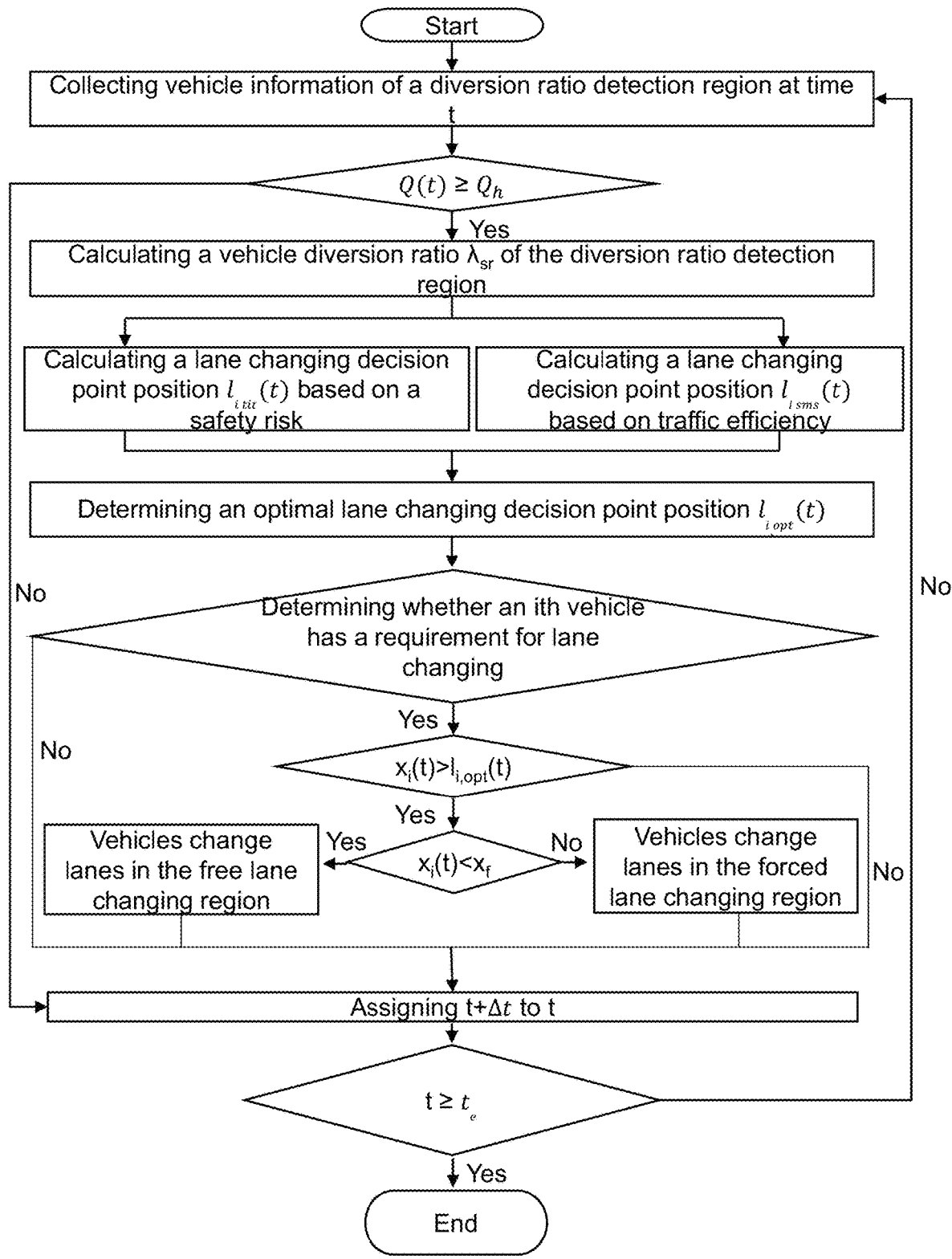
FIG. 2 is a flowchart illustrating an exemplary decision process of a dynamic regulation method according to some embodiments of the present disclosure.
Figure 3:
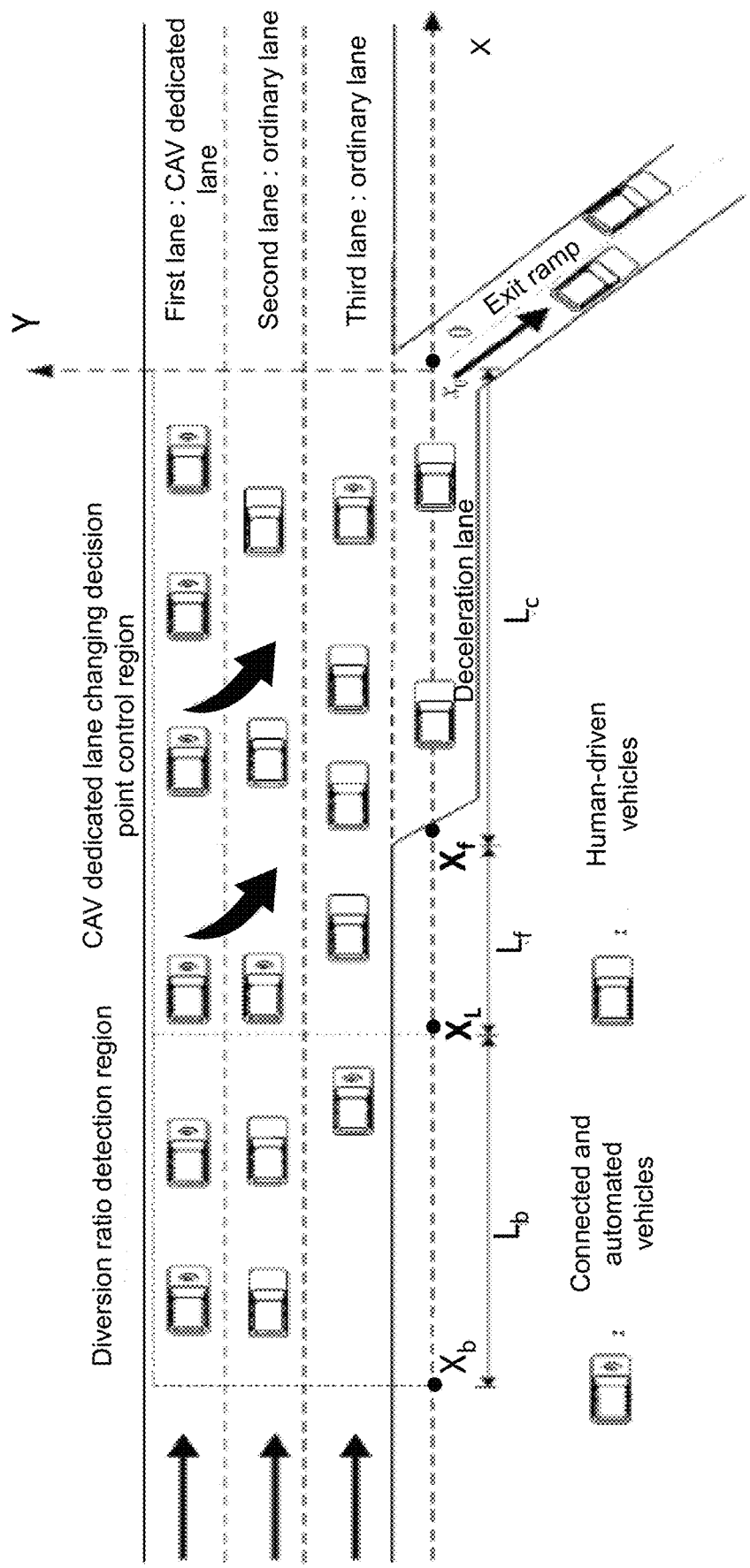
FIG. 3 is a schematic diagram illustrating an application scenario of a dynamic regulation method according to some embodiments of the present disclosure.

As illustrated in FIG. 1, some embodiments of the present disclosure provide a dynamic regulation method for a lane changing decision point of a CAV dedicated lane in a diverging area of an expressway, applied to a one-way three-lane road. Three lanes are denoted as a first lane, a second lane, and a third lane, respectively, from the inside to the outside. The first lane may be the CAV dedicated lane, and the second and third lanes may be ordinary lanes. CAV denotes a connected automated vehicle. Only the CAVs are allowed to travel in the CAV dedicated lane. Vehicle types on the ordinary lanes may not be restricted. A deceleration lane may be provided on an outer side of the third lane. An exit ramp may be provided in front of the deceleration lane. Referring to FIG. 2 and FIG. 3, the dynamic regulation method may comprise the following operations.

Operation 1, a plane coordinate system may be established with an intersection point of a road centerline of the exit ramp and a road centerline of the deceleration lane as an origin, a traveling direction of vehicles as a positive direction of an x-axis, and a direction perpendicular to the x-axis within a plane as a y-axis.

A road with an upstream length s of the exit ramp may be used as the diverging area of the expressway.

A CAV dedicated lane dynamic regulation region may be provided on the CAV dedicated lane at an innermost side of an upstream road of the exit ramp. The CAV dedicated lane dynamic regulation region refers to a rectangular region with the origin as a starting point, a horizontal coordinate $x_L$ on the x-axis as an end point, and a length of L. L may be within a range of 500 m-1000 m based on actual road conditions.

The CAV dedicated lane dynamic regulation region may include a forced lane changing region and a free lane changing region.

The forced lane changing region refers to a rectangular region with the origin as a starting point, a horizontal coordinate $x_f$ on the x-axis as an end point, and a length of $L_c$ on the one-way three-lane road. $L_c$ may be the same as that of a deceleration lane of an actual road.

The free lane changing region refers to a rectangular region with the horizontal coordinate $x_f$ on the x-axis as a starting point, a horizontal coordinate $x_L$ on the x-axis as an end point, and a length of $L_f$ on the one-way three-lane road. $L_f$ may be determined by subtracting $L_c$ from L.

A diversion ratio detection region of a length $L_b$ may be provided on the one-way three-lane road of the upstream road of the CAV dedicated lane dynamic regulation region. The diversion ratio detection region refers to a rectangular region with the horizontal coordinate $x_L$ on the x-axis as a starting point, a horizontal coordinate $x_b$ on the x-axis as an end point, wherein s>L+$L_b$. $L_b$ may be approximately 200 m based on the actual road conditions.

Operation 2, vehicle information of the one-way three-lane road at time t may be collected, including a count of vehicles, and positions, speeds, and accelerations of the vehicles. In some embodiments, the vehicle information may further include other information, such as a vehicle type, a vehicle length, a vehicle acceleration, etc.

Operation 3, whether total traffic flow Q(t)≥$Q_h$ on the one-way three-lane road at the time t is valid may be determined. In response to determining that the total traffic flow Q(t)≥$Q_h$ on the one-way three-lane road at the time t is valid, operation 4 may be performed; and in response to determining that the total traffic flow Q(t)≥$Q_h$ on the one-way three-lane road at the time t is not valid, operation 10 may be performed.

$Q_h$ denotes a road traffic flow threshold for dynamic regulation. In some embodiments, the total traffic flow Q(t) may be determined by calculating a count of vehicles passing through a certain section of the one-way three-lane road within a unit time period in veh/h (i.e., the count of vehicles passing per hour).

Operation 4, a count of CAVs $m_{total}(t)$ in the diversion ratio detection region at the time t may be collected, and a count of CAVs $m_{sr}(t)$ in the diversion ratio detection region about to leave their own lanes and enter the exit ramp at the time t may be counted. In some embodiments, the count of CAVs $m_{total}(t)$ in the diversion ratio detection region and the count of CAVs $m_{sr}(t)$ in the diversion ratio detection region about to leave their own lanes and enter the exit ramp may be obtained through a CAV control platform.

Operation 5, a vehicle diversion ratio $\lambda_{sr}(t)$ at the time t may be calculated using formula (1):

$$\lambda_{sr}(t) = \frac{m_{sr}(t)}{m_{total}(t)}. \tag{1}$$

Operation 6, an ith CAV in the first lane at the time t is denoted as an ith vehicle $q_i^1(t)$ in the first lane, and an optimal lane changing decision point position $l_{i,opt}(t)$ of the ith vehicle $q_i^1(t)$ in the first lane within the CAV dedicated lane dynamic regulation region at the time t may be determined. The optimal lane changing decision point position $l_{i,opt}$ refers to a position most suitable for the ith vehicle $q_i^1(t)$ in the first lane to perform lane changing in consideration of traffic efficiency and a safety risk. In some embodiments, the operation 6 may include operations 6.1-6.3.

Operation 6.1, an optimal lane changing decision point position $l_{i,sms}(t)$ of the ith vehicle $q_i^1(t)$ in the first lane based on the traffic efficiency within the CAV dedicated lane dynamic regulation region at the time t may be calculated using formula (2). The optimal lane changing decision point position $l_{i,sms}(t)$ of the ith vehicle $q_i^1(t)$ in the first lane based on the traffic efficiency means the maximum traffic efficiency of performing lane changing at a current position.

$$\begin{cases} S_{\lambda_{sr}}[l_i(t)] = \alpha_1 l_i^3(t) + \alpha_2 l_i^2(t) + \alpha_3 l_i(t) + b \\ S_{\lambda_{sr}}[l_{i,sms}(t)] = \max_{l_i(t)} S_{\lambda_{sr}}[l_i(t)] \end{cases} \tag{2}$$

wherein $l_i(t)$ denotes a lane changing decision point position of the ith vehicle $q_i^1(t)$ in the first lane at the time t; $\alpha_1$, $\alpha_2$, $\alpha_3$ and b denote four parameters of a cubic polynomial, which may be obtained by fitting experimental data based on simulation, and $S_{\lambda_{sr}}[\cdot]$ denotes a correspondence relationship between the lane changing decision point and the traffic efficiency.

The traffic efficiencies of a plurality of lane changing decision point positions may be calculated using the formula (2), and the lane changing decision point position corresponding to the maximum traffic efficiency may be taken as the optimal lane changing decision point position $l_{i,sms}(t)$ of the ith vehicle $q_i^1(t)$ in the first lane based on the traffic efficiency.

Operation 6.2, an optimal lane changing decision point position $l_{i,ti}(t)$ of the ith vehicle $q_i^1(t)$ in the first lane based on the safety risk within the CAV dedicated lane dynamic regulation region at the time t may be calculated using formula (3). The optimal lane changing decision point position $l_{i,tit}(t)$ of the ith vehicle $q_i^1(t)$ in the first lane based on the safety risk means the minimum safety risk of performing lane changing at the current position, i.e., it is safest to perform lane changing at the current position.

$$\begin{cases} T_{\lambda_{sr}}[l_i(t)] = \beta_1 l_i^3(t) + \beta_2 l_i^2(t) + \beta_3 l_i(t) + d \\ T_{\lambda_{sr}}[l_{i,tit}(t)] = \min_{l_i(t)} T_{\lambda_{sr}}[l_i(t)] \end{cases} \quad (3)$$

wherein $\beta_1$, $\beta_2$, $\beta_3$ and d denote four parameters of a cubic polynomial, which may be obtained by fitting experimental data based on simulation; and $T_{\lambda_{sr}}[\bullet]$ denotes a correspondence relationship between the lane changing decision point and the safety risk.

The safety risks of the plurality of lane changing decision point positions may be calculated using the formula (3), and the lane changing decision point position corresponding to the minimum safety risk may be taken as the optimal lane changing decision point position $l_{i,tit}(t)$ of the ith vehicle $q_i^1(t)$ in the first lane based on the safety risk.

Operation 6.3, an optimal lane changing decision point position $l_{i,opt}(t)$ of the ith vehicle $q_i^1(t)$ in the first lane within the CAV dedicated lane dynamic regulation region at the time t may be calculated using formula (4):

$$l_{i,opt}(t) = k_1 l_{i,sms}(t) + k_2 l_{i,tit}(t) \quad (4)$$

wherein $k_1$ and $k_2$ denote two correction factors, and $k_1 + k_2 = 1$.

In some embodiments, the correction factors may be specified based on actual needs to reflect different levels of emphasis on the traffic efficiency and the safety risk, which are not limited in the present disclosure. In some embodiments, coordinates corresponding to $l_{i,sms}(t)$ and coordinates corresponding to $l_{i,tit}(t)$ may be weighted and summed to obtain the optimal lane changing decision point position $l_{i,opt}(t)$ of the ith vehicle $q_i^1(t)$ in the first lane within the CAV dedicated lane dynamic regulation region at the time t.

Operation 7, whether the ith vehicle $q_i^1(t)$ in the first lane has a requirement for lane changing may be determined, in response to determining that the ith vehicle $q_i^1(t)$ in the first lane has the requirement for lane changing, operation 7.1 may be performed; and in response to determining that the ith vehicle $q_i^1(t)$ in the first lane does not have the requirement for lane changing, operation 10 may be performed.

The requirement for lane changing may be issued by the CAVs to the CAV control platform based on actual needs. For the ith vehicle $q_i^1(t)$ in the first lane, if the CAV control platform receives the requirement for lane changing from the ith vehicle $q_i^1(t)$ in the first lane, it may be determined that the ith vehicle $q_i^1(t)$ in the first lane has the requirement for lane changing.

Operation 7.1, whether a horizontal coordinate $x_i(t) \geq l_{i,opt}(t)$ of the ith vehicle $q_i^1(t)$ in the first lane at the time t is valid may be determined, in response to determining that the horizontal coordinate $x_i(t) \geq l_{i,opt}(t)$ of the ith vehicle $q_i^1(t)$ in the first lane at the time t is valid, operation 7.2 may be performed; and in response to determining that the horizontal coordinate $x_i(t) \geq l_{i,opt}(t)$ of the ith vehicle $q_i^1(t)$ in the first lane at the time t is not valid, operation 10 may be performed.

Operation 7.2, whether $x_i(t) < x_f$ of the ith vehicle $q_i^1(t)$ in the first lane at the time t is valid may be determined, in response to determining that $x_i(t) < x_f$ of the ith vehicle $q_i^1(t)$ in the first lane at the time t is valid, operation 8 may be performed; and in response to determining that $x_i(t) < x_f$ of the ith vehicle $q_i^1(t)$ in the first lane at the time t is not valid, operation 9 may be performed.

Operation 8, a rear vehicle in the second lane relative to the ith vehicle $q_i^1(t)$ in the first lane is denoted as a rear vehicle $q_{j+1}^2(t)$ in the second lane, and a previous vehicle in the second lane relative to the ith vehicle $q_i^1(t)$ in the first lane is denoted as a previous vehicle $q_j^2(t)$ in the second lane.

In response to determining that the ith vehicle $q_i^1(t)$ in the first lane satisfies formula (5), the ith vehicle $q_i^1(t)$ in the first lane may change from the first lane to the second lane, and the operation 10 may be performed; and in response to determining that the ith vehicle $q_i^1(t)$ in the first lane does not satisfy the formula (5), the ith vehicle $q_i^1(t)$ in the first lane may continue to travel in the first lane, and the operation 10 may be performed;

$$\begin{cases} x_j(t) - x_i(t) > d_{safe} \\ x_i(t) - x_{j+1}(t) > d_{safe} \end{cases} \quad (5)$$

wherein $x_j(t)$ denotes a horizontal coordinate of the previous vehicle $q_j^2(t)$ in the second lane at the time t; $x_{j+1}^2(t)$ denotes a horizontal coordinate of the rear vehicle $q_{j+1}^2(t)$ in the second lane at the time t; and $d_{safe}$ denotes a safety distance maintained by the ith vehicle $q_i^1(t)$ in the first lane from the previous vehicle $q_j^2(t)$ in the second lane and the rear vehicle $q_{j+1}^2(t)$ in the second lane when the ith vehicle $q_i^1(t)$ in the first lane enters the second lane.

In some embodiments, the safety distance may be determined based on a current speed of a vehicle, which is not limited in the present disclosure. For example, a distance traveled by the vehicle for 3-4 s in the formula (5) may be taken as the safety distance.

Operation 9, a last lane changing point position $x_{last}$ of the ith vehicle $q_i^1(t)$ in the first lane may be determined using formula (6); and whether $x_i(t) < x_{last}$ is valid may be determined, in response to determining that $x_i(t) < x_{last}$ is valid, operation 9.1 may be performed; and in response to determining that $x_i(t) < x_{last}$ is not valid, the ith vehicle $q_i^1(t)$ in the first lane may complete lane changing by a manner of stopping and waiting, and the operation 10 may be performed.

The last lane changing point position $x_{last}$ means that if the vehicle misses the position, the vehicle may fail to perform lane changing (e.g., miss the exit ramp) if the vehicle continues to travel.

The manner of stopping and waiting means that the CAV brakes in a current lane at the time t and waits for the time for lane changing.

$$x_{last} = L - \frac{v_i^2(t)}{2a_{max}} + x_L \quad (6)$$

Wherein $a_{max}$ denotes a maximum emergency braking acceleration of the CAV. The maximum emergency braking acceleration may vary in value based on different vehicles, which may be obtained from literature of vehicle manual. For example, the maximum emergency braking acceleration may be $a_{max}=-2.5$ m/s². $v_i(t)$ denotes a speed of the ith vehicle $q_i^1(t)$ in the first lane at the time t, which may be obtained from the vehicle information collected in the operation 2.

Operation 9.1, a safety distance $d_{behind}(t)$ maintained by the ith vehicle $q_i^1(t)$ in the first lane within the forced lane changing region at the time t from the rear vehicle $q_{j+1}^2(t)$ in the second lane when the ith vehicle $q_i^1(t)$ in the first lane changes to the second lane and a safety distance $d_{front}(t)$ maintained by the ith vehicle $q_i^1(t)$ in the first lane within the forced lane changing region at the time t from the previous vehicle $q_j^2(t)$ in the second lane when the ith vehicle $q_i^1(t)$ in the first lane changes to the second lane may be obtained using formula (7):

$$\begin{cases} x_i(t) - x_{j+1}(t) = L_{behind}(t) \\ x_j(t) - x_i(t) = L_{front}(t) \\ d_{behind}(t) = \frac{v_{j+1}(t) \cdot \Delta t}{\eta_1} + \eta_2 - l_{veh} \\ d_{front}(t) = \frac{v_i(t) \cdot \Delta t}{\eta_1} + \eta_2 - l_{veh} \end{cases} \quad (7)$$

wherein $L_{behind}(t)$ denotes a longitudinal distance between the ith vehicle $q_i^1(t)$ in the first lane and the rear vehicle $q_{j+1}^2(t)$ in the second lane at the time t, i.e., a spacing between the ith vehicle $q_i^1(t)$ in the first lane and the rear vehicle $q_{j+1}^2(t)$ in the second lane at the time t in an x-axis direction; $L_{front}(t)$ denotes a longitudinal distance between the ith vehicle $q_i^1(t)$ in the first lane and the previous vehicle $q_j^2(t)$ in the second lane at the time t, i.e., a spacing between ith vehicle $q_i^1(t)$ in the first lane and the previous vehicle $q_j^2(t)$ in the second lane at the time t in the x-axis direction; $v_{j+1}(t)$ denotes a speed of the rear vehicle $q_{j+1}^2(t)$ in the second lane at the time t; $\Delta t$ denotes a time interval, wherein the time interval may be a preset value representing a time difference between two sides of collecting the vehicle information of the one-way three-lane road at the time t; $\eta_1$ and $\eta_2$ denote two parameters, which may be preset based on literature; for example, $\eta_1$ may be 3, and $\eta_2$ may be 10; and $l_{veh}$ denotes a vehicle length, which may be set based on actual situation.

Operation 9.2, whether $L_{behind}(t) \geq d_{behind}(t)$ and $L_{front}(t) \geq d_{front}(t)$ are valid may be determined, in response to determining that $L_{behind}(t) \geq d_{behind}(t)$ and $L_{front}(t) \geq d_{front}(t)$ are valid, the ith vehicle $q_i^1(t)$ in the first lane may change to the second lane, and the operation 10 may be performed; and in response to determining that $L_{behind}(t) \geq d_{behind}(t)$ and $L_{front}(t) \geq d_{front}(t)$ are not valid, operation 9.3 may be performed.

Operation 9.3, whether $L_{behind}(t) + L_{front}(t) \geq d_{behind}(t) + d_{front}(t)$ is valid may be determined, in response to determining that $L_{behind}(t) + L_{front}(t) \geq d_{behind}(t) + d_{front}(t)$ is valid, operation 9.4 may be performed; and in response to determining that $L_{behind}(t) + L_{front}(t) \geq d_{behind}(t) + d_{front}(t)$ is not valid, the ith vehicle $q_i^1(t)$ in the first lane may decelerate and keep traveling in the original lane, and the operation 10 may be performed, wherein the acceleration may be within a range of −2.5-0.

Operation 9.4, whether $L_{behind}(t) \geq d_{behind}(t)$ and $L_{front}(t) < d_{front}(t)$ are valid may be determined, in response to determining that $L_{behind}(t) \geq d_{behind}(t)$ and $L_{front}(t) < d_{front}(t)$ are valid, the ith vehicle $q_i^1(t)$ in the first lane may decelerate until the safety distance of the ith vehicle $q_i^1(t)$ in the first lane from the previous vehicle $q_j^2(t)$ in the second lane is greater than $d_{front}(t)$ and change to the second lane, and the operation 10 may be performed;

whether $L_{behind}(t) < d_{behind}(t)$ and $L_{front}(t) \geq d_{front}(t)$ are valid may be determined, in response to determining that $L_{behind}(t) < d_{behind}(t)$ and $L_{front}(t) \geq d_{front}(t)$ are valid, the ith vehicle $q_i^1(t)$ in the first lane may accelerate until the safety distance of the ith vehicle $q_i^1(t)$ in the first lane from the rear vehicle $q_{j+1}^2(t)$ in the second lane is greater than $d_{behind}(t)$ and change to the second lane, and the operation 10 may be performed; and whether $L_{behind}(t) < d_{behind}(t)$ and $L_{front}(t) < d_{front}(t)$ are valid may be determined, in response to determining that $L_{behind}(t) < d_{behind}(t)$ and $L_{front}(t) < d_{front}(t)$ are valid, the ith vehicle $q_i^1(t)$ in the first lane may decelerate and keep traveling in the original lane, and the operation 10 may be performed, wherein the acceleration may be within a range of −2.5-0.

Operation 10, t+Δt may be assigned to t, whether $t \geq t_e$ is valid may be determined, in response to determining that $t \geq t_e$ is valid, regulation may be completed; and in response to determining that $t \geq t_e$ is not valid, the process may return to the operation 2 for sequential operation; wherein $t_e$ denotes a total regulation duration, which may be set based on actual needs; for example, the total regulation duration may be a total duration of peak hours of the traffic flow in the diverging area of the expressway.

Some embodiments of the present disclosure further provide a traffic intelligent device capable of being interconnected with the CAVs in the diverging area of the expressway and connected human-driven vehicles by using a short-time wireless communication means to obtain surrounding traffic information, and sending control information to the CAVs by a vehicle-mounted networking system.

Some embodiments of the present disclosure further provide a non-transitory computer-readable storage medium comprising computer programs that, when executed by a processor, may direct the processor to perform the operations of the dynamic regulation method.

As illustrated in FIG. 3, in some embodiments, a length L of a vehicle lane changing decision point control region of a CAV dedicated lane described above may be set to 1000 m, a length $L_b$ of a diversion ratio detection region may be set to 500 m, a diversion ratio may be set to $\lambda_{sr}=0.5$, and parameters of a cubic fitting polynomial of the lane changing decision point based on a safety risk may be set to $\beta_1=-2.266*10^{-5}$, $\beta_2=2.375*10^{-2}$, $\beta_3=-7.62$, and d=1028, respectively. Parameters of a cubic fitting polynomial of the lane changing decision point based on traffic efficiency may be set to $\alpha_1=-3.603*10^{-8}$, $\alpha_2=4.216*10^{-5}$, $\alpha_3=-1.028*10^{-2}$, and b=18.01, respectively. Correction factors of an optimal lane changing decision point may be set to $k_1=k_2=0.5$. The quantitative analysis may be carried out by numerical simulation experiments, and in a simulation scenario, a CAV penetration rate may be set to 0.5, a total simulation duration may be set to 3600 s, and time intervals $\Delta t_c$ may be set to 1 min, 5 min, 10 min, 15 min, and 20 min, respectively. The results are shown in Table 1, wherein a Time Integrated Time-to-collision (TIT) index refers to a safety evaluation index, which is commonly used in safety evaluation of the risk of rear-end collision of vehicles in the traffic flow.

TABLE 1

| Time interval | Uncontrolled | 1 min | 5 min | 10 min | 15 min | 20 min |
| --- | --- | --- | --- | --- | --- | --- |
| Interval average speed (m/s) | 9.18 | 18.24 | 17.18 | 18.01 | 18.79 | 18.22 |
| TIT index reduction ratio | — | 54.18% | 58.17% | 35.59% | 42.89% | 44.57% |

In this embodiment, the idea of the method provided in the present disclosure is not limited to the traffic flow control in the diverging area of the expressway of the one-way three-lane road, and other embodiments obtained by a person having ordinary skills in the art without creative changes fall within the scope of protection of the present disclosure.

The present disclosure includes but not limited to the following beneficial effects. 1. According to the present disclosure, the CAVs in the CAV dedicated lane of the expressway in the hybrid networking environment can perceive the surrounding traffic information and obtain, by obtaining the information on the traffic flow in the diverging area of the expressway, the optimal vehicle lane changing decision point of the CAV dedicated lane through dynamic regulation, so that the distribution of the lane changing point positions for the CAVs in the CAV dedicated lane is more reasonable, the lane changing conflict region is reduced, and the traffic operation efficiency of the expressway is improved; 2. compared with the prior art, the present disclosure considers the effect of the diversion ratio in the dynamic regulation for the vehicle lane changing decision point of the CAV dedicated lane, and calculates the lane changing decision point positions of the vehicles in the CAV dedicated lane by establishing the corresponding cubic fitting polynomials for different diversion ratios, which makes the lane changing position more accurate and is more in line with the actual traffic situation, thereby greatly improving the efficiency and safety of vehicle lane changing; and 3. compared with the prior art, the present disclosure continuously reacquires the traffic information with a certain time step, and carries out real-time updating of the lane changing decision point positions of the vehicles in the CAV dedicated lane based on the real-time traffic situation, thereby improving the traffic operation efficiency of the diverging area of the expressway.

The basic concept has been described above. Obviously, for those skilled in the art, the above detailed disclosure is only an example, and does not constitute a limitation to the present disclosure. Although not expressly stated here, those skilled in the art may make various modifications, improvements, and corrections to the present disclosure. Such modifications, improvements and corrections are suggested in this disclosure, so such modifications, improvements and corrections still belong to the spirit and scope of the exemplary embodiments of the present disclosure.

Meanwhile, the present disclosure uses specific words to describe the embodiments of the present disclosure. For example, "one embodiment", "an embodiment", and/or "some embodiments" refer to a certain feature, structure or characteristic related to at least one embodiment of the present disclosure. Therefore, it should be emphasized and noted that references to "one embodiment" or "an embodiment" or "an alternative embodiment" two or more times in different places in the present disclosure do not necessarily refer to the same embodiment. In addition, certain features, structures, or characteristics in one or more embodiments of the present disclosure may be properly combined.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A dynamic regulation method for a lane changing decision point of a connected and automated vehicle (CAV)-dedicated lane in a diverging area of an expressway, applied to a one-way three-lane road, wherein three lanes are denoted as a first lane, a second lane, and a third lane, respectively, from the inside to the outside; the first lane is the CAV dedicated lane, and the second and third lanes are ordinary lanes; CAV denotes a connected and automated vehicle; only the CAV is allowed to travel on the CAV dedicated lane, vehicle types on the ordinary lanes are not restricted, a deceleration lane is provided at an outer side of the third lane, and an exit ramp is provided in front of the deceleration lane; wherein the dynamic regulation method comprises the following operations;

operation 1, establishing a plane coordinate system with an intersection point of a road centerline of the exit ramp and a road centerline of the deceleration lane as an origin, a traveling direction of vehicles as a positive direction of an x-axis, and a direction perpendicular to the x-axis as a y-axis;

using a road located upstream of the exit ramp with a length of S as a diverging area of the expressway;

providing a CAV dedicated lane dynamic regulation region on the CAV dedicated lane at an innermost side of an upstream road of the exit ramp, wherein the CAV dedicated lane dynamic regulation region is a rectangular region with the origin as a starting point, a horizontal coordinate $x_L$ on the x-axis as an end point, and a length of L; wherein:

the CAV dedicated lane dynamic regulation region includes a forced lane changing region and a free lane changing region;

the forced lane changing region is a rectangular region with the origin as a starting point, a horizontal coordinate $x_f$ on the x-axis as an end point, and a length of $L_c$;

the free lane changing region is a rectangular region with the horizontal coordinate $x_f$ on the x-axis as a starting point, a horizontal coordinate $x_L$ on the x-axis as an end point, and a length of $L_f$;

providing a diversion ratio detection region of a length $L_b$ on the one-way three-lane road of the upstream road of the CAV dedicated lane dynamic regulation region, wherein the diversion ratio detection region is a rectangular region with the horizontal coordinate $x_L$ on the x-axis as a starting point, a horizontal coordinate $x_b$ on the x-axis as an end point, and $S>L+L_b$;

operation 2, collecting vehicle information of the one-way three-lane road at time t, including a count of vehicles passing through a certain section of the one-way three-lane road within a unit time period, and positions, speeds, and accelerations of the vehicles;

operation 3, determining whether total traffic flow $Q(t) \geq Q_h$ on the one-way three-lane road at the time t is valid; in response to determining that the total traffic flow $Q(t) \geq Q_h$ on the one-way three-lane road at the time t is valid, performing operation 4; and in response to determining that the total traffic flow $Q(t) \geq Q_h$ on the one-way three-lane road at the time t is not valid, performing operation 10; wherein $Q_h$ denotes a road traffic flow threshold for dynamic regulation;

operation 4, collecting a count of CAVs $m_{total}(t)$ in the diversion ratio detection region at the time t, and counting a count of CAVs $m_{sr}(t)$ in the diversion ratio detection region about to leave their own lanes and enter the exit ramp at the time t;

operation 5, calculating a vehicle diversion ratio $\lambda_{sr}(t)$ at the time t using formula (1);

$$\lambda_{sr}(t) = \frac{m_{sr}(t)}{m_{total}(t)} \qquad (1)$$

operation 6, denoting an ith CAV in the first lane at the time t $q_i^1(t)$, and determining an optimal lane changing decision point position $l_{i,opt}(t)$ of the ith vehicle $q_i^1(t)$ in the first lane within the CAV dedicated lane dynamic regulation region at the time t;

operation 6.1, calculating an optimal lane changing decision point position $l_{i,sms}(t)$ of the ith vehicle $q_i^1(t)$ in the first lane based on traffic efficiency within the CAV dedicated lane dynamic regulation region at the time t by using formula (2);

$$\begin{cases} S_{\lambda_{sr}}[l_i(t)] = \alpha_1 l_i^3(t) + \alpha_2 l_i^2(t) + \alpha_3 l_i(t) + b \\ S_{\lambda_{sr}}[l_{i,sms}(t)] = \max_{l_i(t)} S_{\lambda_{sr}}[l_i(t)] \end{cases} \qquad (2)$$

wherein $\alpha_1$, $\alpha_2$, $\alpha_3$ and b denote four parameters of a cubic polynomial, $l_i(t)$ denotes a lane changing decision point position of the ith vehicle $q_i^1(t)$ in the first lane at the time t, and $S_{\lambda_{sr}}[\cdot]$ denotes a correspondence relationship between the lane changing decision point and the traffic efficiency;

operation 6.2, calculating an optimal lane changing decision point position $l_{i,tit}(t)$ of the ith vehicle $q_i^1(t)$ in the first lane based on a safety risk within the CAV dedicated lane dynamic regulation region at the time t by using formula (3);

$$\begin{cases} T_{\lambda_{sr}}[l_i(t)] = \beta_1 l_i^3(t) + \beta_2 l_i^2(t) + \beta_3 l_i(t) + d \\ T_{\lambda_{sr}}[l_{i,tit}(t)] = \min_{l_i(t)} T_{\lambda_{sr}}[l_i(t)] \end{cases} \qquad (3)$$

wherein $\beta_1$, $\beta_2$, $\beta_3$, and d denote four parameters of a cubic polynomial, and $T_{\lambda_{sr}}[\cdot]$ denotes a correspondence relationship between the lane changing decision point and the safety risk;

operation 6.3, calculating an optimal lane changing decision point position $l_{i,opt}(t)$ of the ith vehicle $q_i^1(t)$ in the first lane within the CAV dedicated lane dynamic regulation region at the time t by using formula (4);

$$l_{i,opt}(t) = k_1 l_{i,sms}(t) + k_2 l_{i,tit}(t) \qquad (4)$$

wherein $k_1$ and $k_2$ denote two correction factors, and $k_1 + k_2 = 1$;

operation 7, determining whether the ith vehicle $q_i^1(t)$ in the first lane has a requirement for lane changing; in response to determining that the ith vehicle $q_i^1(t)$ in the first lane has the requirement for lane changing, performing operation 7.1; and in response to determining that the ith vehicle $q_i^1(t)$ in the first lane does not have the requirement for lane changing, performing operation 10;

operation 7.1, determining whether a horizontal coordinate $x_i(t) > l_{i,opt}(t)$ of the ith vehicle $q_i^1(t)$ in the first lane at the time t is valid; in response to determining that the horizontal coordinate $x_i(t) > l_{i,opt}(t)$ of the ith vehicle $q_i^1(t)$ in the first lane at the time t is valid, performing operation 7.2; and in response to determining that the horizontal coordinate $x_i(t) > l_{i,opt}(t)$ of the ith vehicle $q_i^1(t)$ in the first lane at the time t is not valid, performing operation 10;

operation 7.2, determining whether $x_i(t) < x_f$ is valid; in response to determining that $x_i(t) < x_f$ is valid, performing operation 8; and in response to determining that $x_i(t) < x_f$ is not valid, performing operation 9;

operation 8, denoting a rear vehicle in the second lane relative to the ith vehicle $q_i^1(t)$ in the first lane as a rear vehicle $q_{j+1}^2(t)$ in the second lane; denoting a previous vehicle in the second lane relative to the ith vehicle $q_i^1(t)$ in the first lane as a previous vehicle $q_j^2(t)$ in the second lane;

in response to determining that the ith vehicle $q_i^1(t)$ in the first lane satisfies formula (5), changing the ith vehicle $q_i^1(t)$ in the first lane from the first lane to the second lane, and performing the operation 10; and in response to determining that the ith vehicle $q_i^1(t)$ in the first lane does not satisfy the formula (5), keeping the ith vehicle $q_i^1(t)$ in the first lane travelling in the first lane, and performing the operation 10;

$$\begin{cases} x_j(t) - x_i(t) > d_{safe} \\ x_i(t) - x_{j+1}(t) > d_{safe} \end{cases} \qquad (5)$$

wherein $x_j(t)$ denotes a horizontal coordinate of the previous vehicle $q_j^2(t)$ in the second lane at the time t, $x_{j+1}(t)$ denotes a horizontal coordinate of the rear vehicle $q_{j+1}^2(t)$ in the second lane at the time t, and $d_{safe}$ denotes a safety distance maintained by the ith vehicle $q_i^1(t)$ in the first lane from the previous vehicle $q_j^2(t)$ in the second lane and the rear vehicle $q_{j+1}^2(t)$ in the second lane when the ith vehicle $q_i^1(t)$ in the first lane enters the second lane;

operation 9, determining a last lane changing point position $x_{last}$ of the ith vehicle $q_i^1(t)$ in the first lane by using formula (6); determining whether $x_i(t)<x_{last}$ is valid; in response to determining that $x_i(t)<x_{last}$ is valid, performing operation 9.1; and in response to determining that $x_i(t)<x_{last}$ is not valid, completing changing lane of the ith vehicle $q_i^1(t)$ in the first lane by a manner of stopping and waiting, and performing the operation 10;

$$x_{last} = L - \frac{v_i^2(t)}{2a_{max}} + x_L \quad (6)$$

wherein $a_{max}$ denotes a maximum emergency braking acceleration of the CAV and $v_i(t)$ denotes a speed of the ith vehicle $q_i^1(t)$ in the first lane at the time t;

operation 9.1, obtaining a safety distance $d_{behind}(t)$ maintained by the ith vehicle $q_i^1(t)$ in the first lane within the forced lane changing region at the time t from the rear vehicle $q_{j+1}^2(t)$ in the second lane when the ith vehicle $q_i^1(t)$ in the first lane changes to the second lane by using formula (7), and obtaining a safety distance $d_{front}(t)$ maintained by the ith vehicle $q_i^1(t)$ in the first lane within the forced lane changing region at the time t from the previous vehicle $q_j^2(t)$ in the second lane when the ith vehicle $q_i^1(t)$ in the first lane changes to the second lane by using formula (7);

$$\begin{cases} x_i(t) - x_{j+1}(t) = L_{behind}(t) \\ x_j(t) - x_i(t) = L_{front}(t) \\ d_{behind}(t) = \frac{v_{j+1}(t) \cdot \Delta t}{\eta_1} + \eta_2 - l_{veh} \\ d_{front}(t) = \frac{v_i(t) \cdot \Delta t}{\eta_1} + \eta_2 - l_{veh} \end{cases} \quad (7)$$

wherein $L_{behind}(t)$ denotes a longitudinal distance between the ith vehicle $q_i^1(t)$ in the first lane and the rear vehicle $q_{j+1}^2(t)$ in the second lane at the time t; $L_{front}(t)$ denotes a longitudinal distance between the ith vehicle $q_i^1(t)$ in the first lane and the previous vehicle $q_j^2(t)$ in the second lane at the time t; $v_{j+1}(t)$ denotes a speed of the rear vehicle $q_{j+1}^2(t)$ in the second lane at the time t; $\Delta t$ denotes a time interval; $\eta_1$ and $\eta_2$ denote two parameters; and $l_{veh}$ denotes a vehicle length;

operation 9.2, determining whether $L_{behind}(t) \geq d_{behind}(t)$ and $L_{front}(t) \geq d_{front}(t)$ are valid; in response to determining that $L_{behind}(t) \geq d_{behind}(t)$ and $L_{front}(t) \geq d_{front}(t)$ are valid, changing the ith vehicle $q_i^1(t)$ in the first lane to the second lane, and performing the operation 10; and in response to determining that $L_{behind}(t) \geq d_{behind}(t)$ and $L_{front}(t) \geq d_{front}(t)$ are not valid, performing operation 9.3;

operation 9.3, determining whether $L_{behind}(t) + L_{front}(t) \geq d_{behind}(t) + d_{front}(t)$ is valid; in response to determining that $L_{behind}(t) + L_{front}(t) \geq d_{behind}(t) + d_{front}(t)$ is valid, performing operation 9.4; and in response to determining that $L_{behind}(t) + L_{front}(t) \geq d_{behind}(t) + d_{front}(t)$ is not valid, decelerating the ith vehicle $q_i^1(t)$ in the first lane and keeping the ith vehicle $q_i^1(t)$ in the first lane traveling in the original lane, and performing the operation 10;

operation 9.4, determining whether $L_{behind}(t) \geq d_{behind}(t)$ and $L_{front}(t) < d_{front}(t)$ are valid; in response to determining that $L_{behind}(t) \geq d_{behind}(t)$ and $L_{front}(t) < d_{front}(t)$ are valid, decelerating the ith vehicle $q_i^1(t)$ in the first lane until the safety distance of the ith vehicle $q_i^1(t)$ in the first lane from the previous vehicle $q_j^2(t)$ in the second lane is greater than $d_{front}(t)$ and then changing the ith vehicle $q_i^1(t)$ in the first lane to the second lane, and performing the operation 10;

determining whether $L_{behind}(t) < d_{behind}(t)$ and $L_{front}(t) \geq d_{front}(t)$ are valid; in response to determining that $L_{behind}(t) < d_{behind}(t)$ and $L_{front}(t) \geq d_{front}(t)$ are valid, accelerating the ith vehicle $q_i^1(t)$ in the first lane until the safety distance of the ith vehicle $q_i^1(t)$ in the first lane from the rear vehicle $q_{j+1}^2(t)$ in the second lane is greater than $d_{behind}(t)$ and then changing the ith vehicle $q_i^1(t)$ in the first lane to the second lane, and performing the operation 10;

determining whether $L_{behind}(t) < d_{behind}(t)$ and $L_{front}(t) < d_{front}(t)$ are valid; in response to determining that $L_{behind}(t) < d_{behind}(t)$ and $L_{front}(t) < d_{front}(t)$ are valid, decelerating the ith vehicle $q_i^1(t)$ in the first lane and keeping the ith vehicle $q_i^1(t)$ in the first lane traveling in the original lane, and performing the operation 10;

operation 10, assigning $t+\Delta t$ to t, and determining whether $t \geq t_e$ is valid; in response to determining that $t \geq t_e$ is valid, regulation is completed; and in response to determining that $t \geq t_e$ is not valid, returning the process to the operation 2 and then performing sequentially with operations 2-10; wherein $t_e$ denotes a total regulation duration, $\Delta t$ denotes a time interval.

2. An electronic device, comprising a storage device and a processor, wherein the storage device is configured to store programs for supporting the processor in performing the dynamic regulation method of claim 1, and the processor is configured to execute the programs stored in the storage device.

3. A non-transitory computer-readable storage medium, comprising computer programs that, when executed by a processor, direct the processor to the perform the operations of the dynamic regulation method of claim 1.

* * * * *